United States Patent
Nanri et al.

(10) Patent No.: US 6,470,771 B2
(45) Date of Patent: Oct. 29, 2002

(54) TRANSMISSION SYSTEM

(75) Inventors: Takehiko Nanri; Yoshihisa Kanno, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 15 days.

(21) Appl. No.: 09/820,920

(22) Filed: Mar. 30, 2001

(65) Prior Publication Data

US 2001/0037697 A1 Nov. 8, 2001

(30) Foreign Application Priority Data

Mar. 31, 2000 (JP) ........................................ 2000-099452

(51) Int. Cl.[7] ............................................... F16H 47/00
(52) U.S. Cl. ..................................... 74/733.1; 74/731.1
(58) Field of Search ............................. 74/731.1, 732.1, 74/733.1, 730.1, 218, 220; 60/487; 92/12.1, 12.2

(56) References Cited

U.S. PATENT DOCUMENTS

| 5,213,548 A | * | 5/1993 | Colbert et al. ............... 280/238 |
| 5,522,213 A | * | 6/1996 | Bustamante .................. 60/327 |
| 5,900,705 A | * | 5/1999 | Kimura ........................ 180/221 |
| 6,031,190 A | * | 2/2000 | Tokuda et al. ............ 200/11 R |
| 6,089,118 A | * | 7/2000 | Ishii et al. ................ 200/61.88 |
| 6,151,977 A | * | 11/2000 | Menig et al. .............. 74/336 R |
| 6,223,112 B1 | * | 4/2001 | Nishino ....................... 477/125 |
| 6,343,470 B1 | * | 2/2002 | Nanri et al. ................... 60/448 |

FOREIGN PATENT DOCUMENTS

| JP | 9-203460 | 8/1997 |
| JP | 9-264416 | 10/1997 |

* cited by examiner

*Primary Examiner*—Douglas C. Butler
*Assistant Examiner*—Devon C Kramer
(74) *Attorney, Agent, or Firm*—Birch, Stewart, Kolasch & Birch, LLP

(57) ABSTRACT

A transmission system including an automatic transmission having a plurality of speed change modes, including at least a continuously variable speed change node and a steeping speed change mode, and a sub-transmission connected to the automatic transmission. The sub-transmission is capable of switching to one of a plurality of running ranges including at least a forward range, a neutral range, and a reverse range. The transmission system also includes a mode switch for selectively switching to one of the plurality of speed change modes of the automatic transmission, and a shift switch for switching from one speed change stage to another speed change when the stepping speed change mode is active. Functionally of the shift switch and the mode switch are collectively integrated into a common switch, and the common switch is selectively used as the shift switch or the mode switch.

10 Claims, 12 Drawing Sheets

← Shift-up

-----⇾ Shift-down

TRANSMISSION SYSTEM

BACKGROUND OF THE INVENTION

1. Field of the Invention

The present invention relates to a switch used for mode selection and shift operation at the time of stepping speed change, in particular, a switch used for a transmission system including an automatic transmission capable of switching an automatic speed change mode allowing continuously variable speed change to or from a stepping speed change mode allowing stepping speed change ratio control (hereinafter, referred to as "stepping speed change control") like manual type multistage transmission.

2. Related Art

Japanese Patent Laid-open No. Hei 9-203460 discloses a transmission system including an automatic transmission composed of a hydrostatic type automatic transmission (hereinafter, sometimes referred to as "HFT") and a sub-transmission connected to the automatic transmission in series. The hydrostatic type automatic transmission is configured such that a fixed displacement swash plate type hydraulic pump is connected to a variable displacement swash plate type hydraulic motor via a hydraulic closed circuit. In this transmission system, the automatic transmission includes an automatic speed change mode allowing continuously variable speed change and a stepping speed change mode allowing multistage speed change, wherein stepping speed change is started under the stepping speed change mode which is switched from the automatic speed change mode by a mode switch. This stepping speed change control can be performed just as a manual type multistage transmission by selecting a target speed change ratio from a plurality of predetermined speed change ratios by means of a shift switch.

Japanese Patent Laid-open No. Hei 9-264416 discloses a transmission system in which a mode switch and a shift switch are separately provided on a steering handle.

In addition to the above, known transmission systems, used with handlebar type vehicles include a shift switch provided on the left side of a handlebar, and a mode switch provided on a handle cover separated from the shift switch.

The above-described prior art transmissions of the type in which the mode switch and the shift switch are separately provided have specific disadvantages. One such disadvantage is that since switches specialized for mode selection and shift operation must be provided, the number of parts becomes large, and since the mode switch and the shift switch are different from each other in terms of opportunity of operation and operational manner, special care is required to prevent these switches from being erroneously used.

The transmission used for a handlebar type vehicle has another problem. Since the mode switch is provided at a location separated from the handlebar, a driver must separate his or her hand from the handlebar for each mode switching operation, with a result that the mode switching operation becomes complicated.

SUMMARY OF THE INVENTION

An object of the present invention is to solve these problems of the prior art transmissions.

To achieve the above object, according to the present invention, there is provided a transmission system including: an automatic transmission having a plurality of speed change modes including at least a continuously variable speed change mode and a steeping speed change mode; a sub-transmission connected to the automatic transmission, the sub-transmission being capable of switching one of a plurality of running ranges containing a forward range, a neutral range, and a reverse range to another; a mode switch for selectively switching either of the plurality of speed change modes of the automatic transmission; and a shift switch for switching one of speed change stages to another under the stepping speed change mode, a function of the shift switch and a function of the mode switch are collectively integrated into a common switch, and the common switch is selectively used as the shift switch or the mode switch.

In the above transmission system, the common switch may be configured to be usually used as the shift switch and used as the mode switch only when brake operation is confirmed or only when the running range becomes the neutral range; and further the forward running side of the running ranges may be configured as to include only one range.

According to the present invention, since the functions of the shift switch and the mode switch are collectively integrated into the common switch and the common switch can be selectively used as the shift switch or the mode switch, it is not required to provide switches specialized for mode selection and shift operation, with a result that the number of parts can be reduced. Additionally, because the shift switch and the mode switch can be disposed at one location, the mounting and usage of these switches become convenient.

According to a specific configuration in which the common switch is usually used as the shift switch and the common switch is changed into the mode switch only when brake operation is confirmed, the shift switch can be used as the mode switch under the condition that manual control is not carried out, with a result that the shift switch can be prevented from being erroneously used as the mode switch even in a running range. According to another specific configuration in which the common switch is changed into the mode switch only when the running range becomes the neutral range, the shift switch can be also prevented from being erroneously used as the mode switch.

According to a further specific configuration in which the front running side of the running ranges is switched by the sub-transmission, which generally includes two or more running ranges such as a low (L) range and a drive (D) range, the transmission can be configured to include only one running range by setting the automatic transmission such that the front running side is expanded to include the low side. Accordingly, it is possible to eliminate the need of switching one of the running ranges on the forward side to another, that is, to eliminate the laborious operation required for the conventional general sub-transmission, in which the driver's hand must be separated each time the L (low) range is switched to or from the D (drive) range. Furthermore, since the speed change mode and the speed change stage under the stepping speed change mode can be switched only by operating the common switch, the speed change operation for running on the forward side can be performed without separation of the driver's hand from the handlebar.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
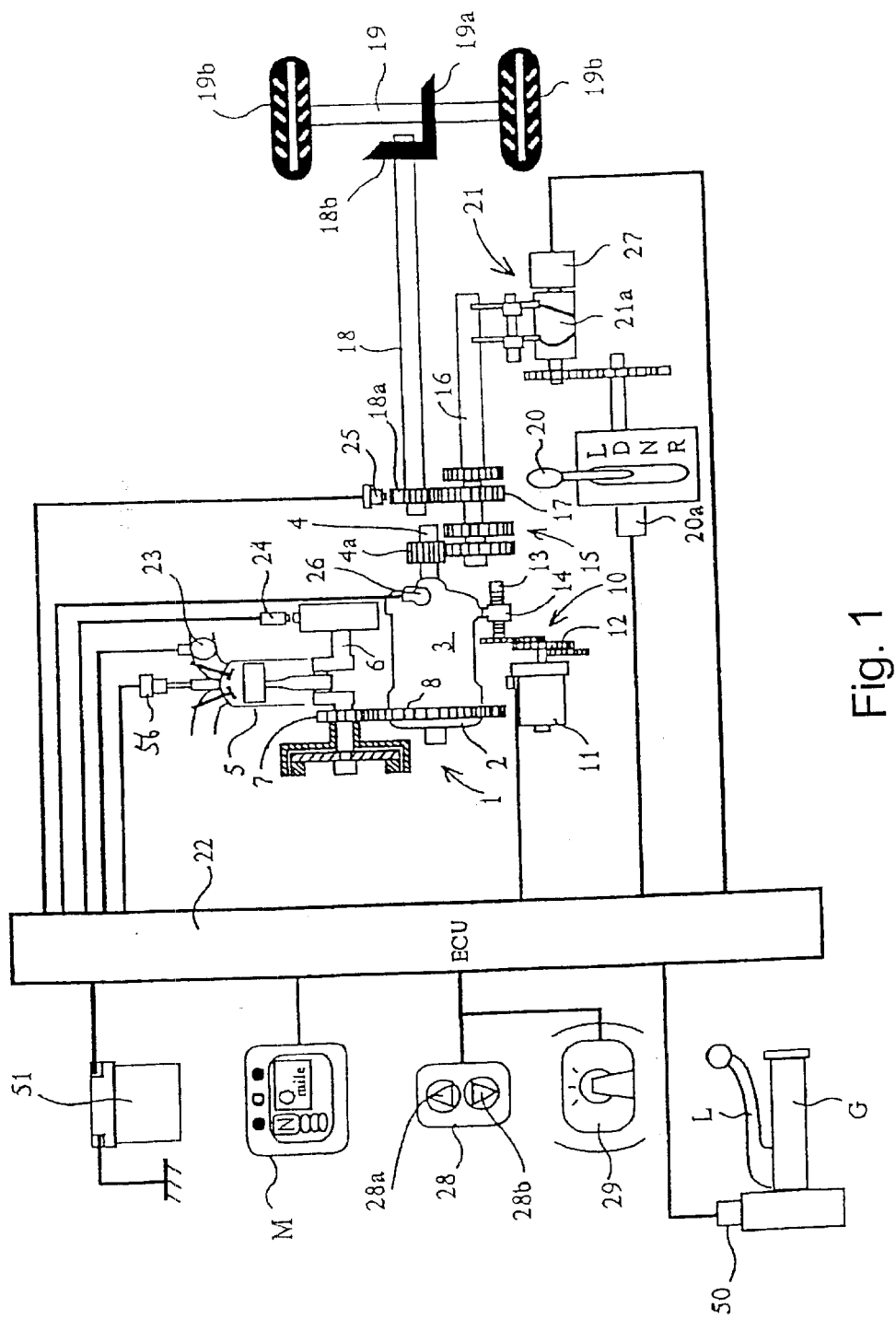
FIG. 1 is a diagram showing a control system of a control unit according to the embodiment of the present invention.

The control of a hydrostatic type automatic transmission will be first schematically described with reference to FIG. 1. A hydrostatic type automatic transmission 1 is configured such that a fixed displacement hydraulic pump 2 and a variable displacement hydraulic motor 3 are integrally provided on a drive shaft 4 and are connected to each other via a hydraulic closed circuit. The variable displacement hydraulic motor 3 is speed-changeably rotated by a hydraulic pressure generated by rotating a driven gear 8, of the fixed displacement hydraulic pump 2, via a drive gear 7 provided on a crank shaft 6 of an engine 5. The speed-changed rotation of the motor 3 is then outputted to a drive shaft 4. The speed change ratio can be freely varied by changing a tilt angle of a movable swash plate (described later) built in the movable displacement hydraulic motor 3 by using a tilt angle control mechanism 10.

The tilt angle control mechanism 10 is configured such that the output of a control motor 11 is transmitted to a reduction gear 12, to change the tilt angle of the movable swash plate built in the variable displacement hydraulic motor 3, via a combination of a ball screw 13 and a slider 14. The speed-changed output of the hydrostatic type automatic transmission 1 is transmitted from an output gear 4a of the drive shaft 4 to a sub-transmission 15 as a secondary reduction gear, and the speed-changed output of the sub-transmission 15 is transmitted from an output gear 17 on a speed-change output shaft 16 to a final output gear 18a on a final output shaft 18. The output of the final output shaft 18 is further transmitted from a bevel gear 18b provided at the end of the final output shaft 18 to a bevel gear 19a of an axle 19, to rotate drive wheels 19b.

The sub-transmission 15 switches a running range by manually operating a sub-transmission lever 20, thereby driving a shifter 21. To be more specific, the sub-transmission 15 switches one of an L or D range (forward running side), an R range (reverse running side), and an N position (neutral) to another. The L range is for low speed running; the D range is for normal running; the N position is for neutral; and the R range is for reverse running. When the gear position is shifted to the R range, the speed change ratio is fixed at a LOW ratio. The selection of one of running ranges L, D, and N by the sub-transmission lever 20 is detected by a shift position sensor 27 provided on the shifter 21, and a detection signal from the sensor 27 is inputted in a control unit 22. The shift of the gear position to the R range is detected by a reverse switch 20a, and a detection signal from the reverse switch 20a is inputted to the control unit 22.

When the gear position is shifted to each of the L and D ranges on the forward running side, one of speed change modes previously set for various running modes to be described later can be switchingly selected by operating a mode map switch 29 provided on a handlebar. The mode map switch 29 is equivalent to a mode switch of the present invention. The running modes switchable by the mode map switch 29 are basically classified into an automatic speed change mode and a stepping speed change mode. When the stepping speed change mode is selected, the speed change ratio can be shifted up or shifted down by manually operating a shift switch 28 provided on the handlebar.

The shift switch 28 and the mode map switch 29 in the embodiment are configured as a common switch to be described later. The common switch is provided in the vicinity of a left grip (not shown) of the handlebar and can be operated with the driver's left hand with the grip grasped by the left hand. A brake switch 50 is provided in the vicinity of a right grip G. When the brake is actuated by operating a brake lever L of the handlebar, the braking operation is detected by the brake switch 50, and a detection signal from the brake switch 50 is inputted to the control unit 22.

Figure 7:
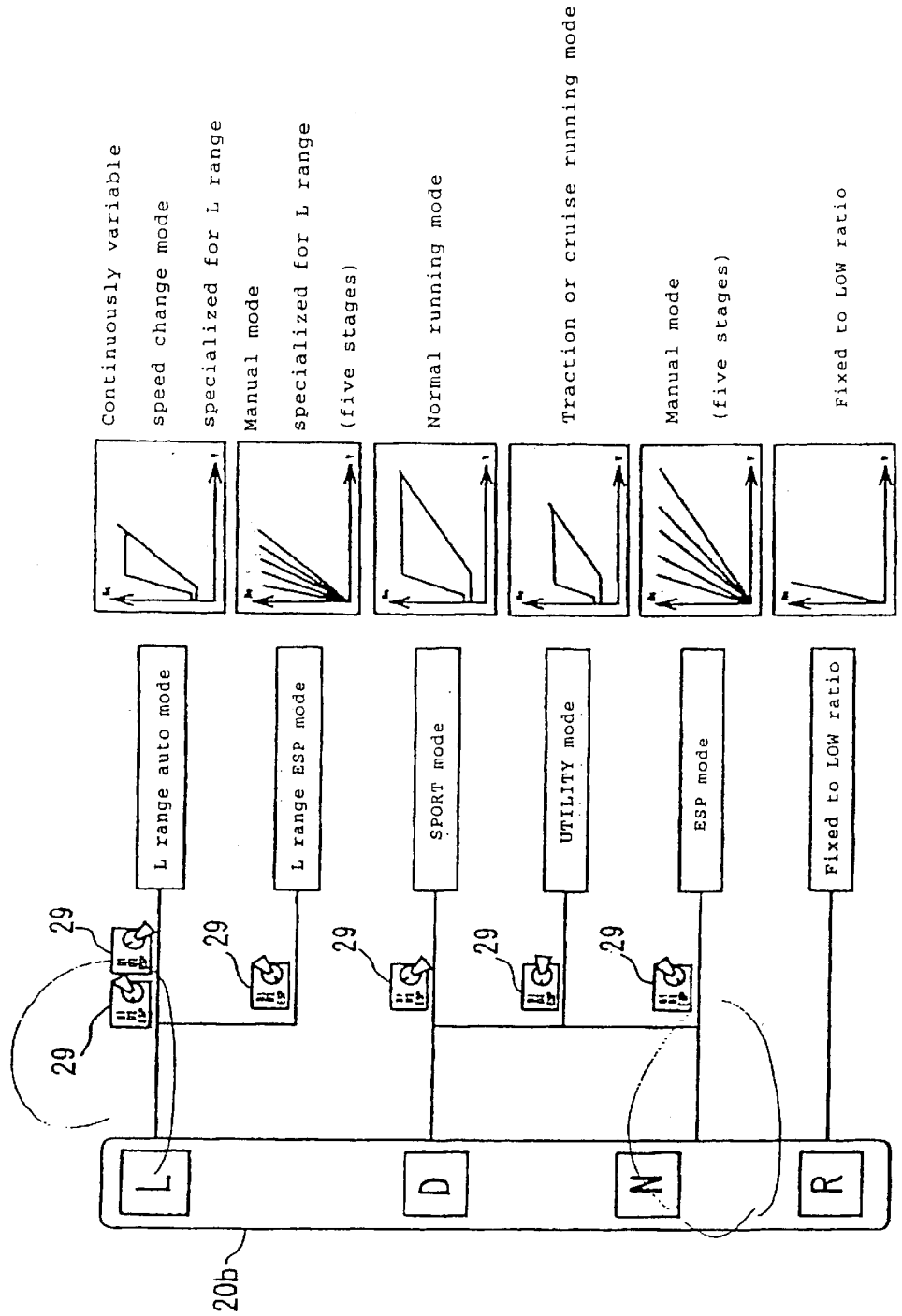
FIG. 7 is a diagram showing various modes.

FIG. 7 is a diagram illustrating various running modes previously prepared. In the case of selecting the L range by operating the sub-transmission lever 20, an L range auto-mode, which is a continuously variable speed change mode specialized for the L range, is set by switching the mode map switch 29 into the speed change mode D1 or D2. An L range ESP mode, which is a manual mode specialized for the L range and which allows manual speed change at one of five speed stages on the forward running side, is set by switching the mode map switch 29 into ESP.

When the D range is selected by operating the sub-transmission lever 20, a sport mode suitable for normal running is set by switching the mode map switch 29 into the speed change mode D1; a utility mode suitable for traction or cruise running is set by switching the mode map switch 29 into the speed change mode D2; and a manual mode for normal running, which allows manual speed change at one of five speed stages on the forward running side, is set by switching the mode map switch 29 into ESP. In addition, the mode map switch 29 is shown as a mechanical type rotary switch in FIGS. 1 and 7 for convenience; however, in actual, such a rotary switch is not present, and as will be described later, the mode map switch 29 is contained in the common button type switch shown as the shift switch 28 in such a manner that the function of the mode map switch 29 is collectively integrated with the function of the shift switch.

In these continuously variable speed change mode and stepping (manual) speed change mode, the speed change is actually performed by tilt angle control. The tilt angle control is performed by driving the control motor 11 of the tilt angle control mechanism 10 on the basis of signals supplied from various sensors to the control unit 22. The control unit 22 outputs signals, which are to be displayed on an indicator of an instrument panel M, to the instrument panel M. Sensors will be described in detail later.

Figure 2:
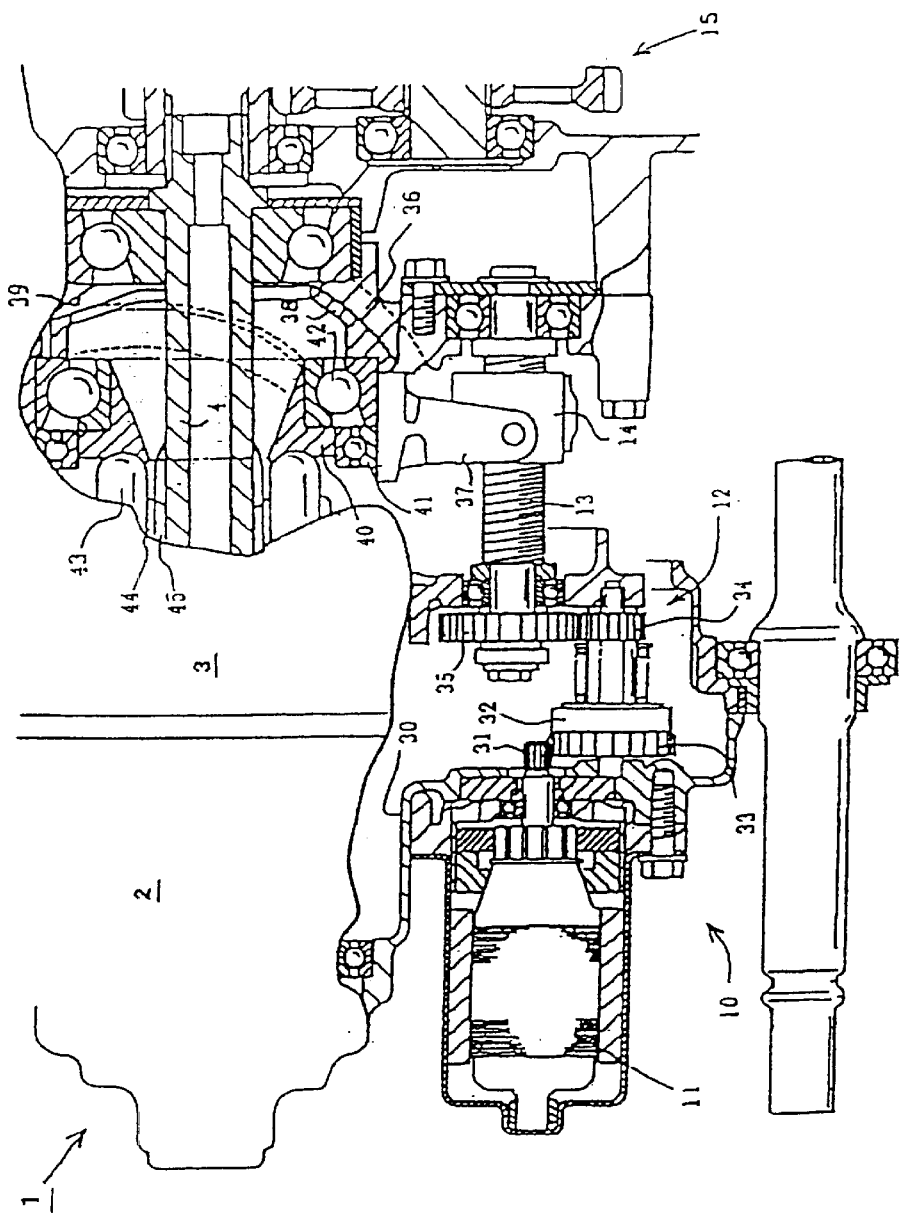
FIG. 2 is a view showing a tilt angle control mechanism portion of a movable swash plate of a hydrostatic type automatic transmission according to the embodiment of the present invention.

The tilt angle control mechanism 10 will be described with reference to FIG. 2. The control motor 11 of the tilt angle control mechanism 10 is supported by a housing 30 of the fixed displacement hydraulic pump 2, and an output from an output gear 31 is transmitted to a ball screw drive gear 35 from a gear 34 via an input gear 33 of a torque limiter 32. The ball screw drive gear 35 is rotated integrally with the ball screw 13. When the ball screw 13 is normally or reversely rotated, the slider 14 having a nut engaged with the ball screw 13 is moved forward or backward in the axial direction. Both ends of the ball screw 13 are supported by a housing 36 of the hydraulic motor 3.

One end of an arm 37 projecting outwardly from the housing 36 of the variable displacement hydraulic motor 3 is turnably mounted to the slider 14, and the other end of the arm 37 is integrated with a swash plate holder 38 supported in the housing 36. The swash plate holder 38 is supported on a recessed curve surface portion 39 formed on the inner surface of the housing 36 in such a manner as to be freely rolled thereon. When the arm 37 is turned, the swash plate holder 38 is turned, integrally with the arm 37, on the recessed curve surface portion 39, whereby the angle of the swash plate holder 38 is changed.

A movable swash plate 40 is rotatably supported inside the swash plate holder 38 via bearings 41 and 42. As the angle of the swash plate holder 38 is changed, a tilt angle formed between a rotating plane of the movable swash plate 40 and the axial line of the drive shaft 4 is changed. Additionally, FIG. 2 shows a TOP state having a speed change ratio of 1.0, in which the tilt angle is set to 90°.

A plurality of hydraulic plungers 43 of the variable displacement hydraulic motor 3 are disposed on a drum-like rotator 44 in such a manner as to be arranged in the circumferential direction. The hydraulic plungers 43 are pushed against the movable swash plate 40 by a hydraulic pressure applied from the fixed displacement hydraulic pump 2 side, to give a rotating force to the rotator 44 according to the tilt angle of the movable swash plate 40. An outer peripheral portion of the rotator 44 is spline-connected (designated by reference numeral 45) to the drive shaft 4, so that the drive shaft 4 is rotated by rotation of the rotator 44.

Figure 3:
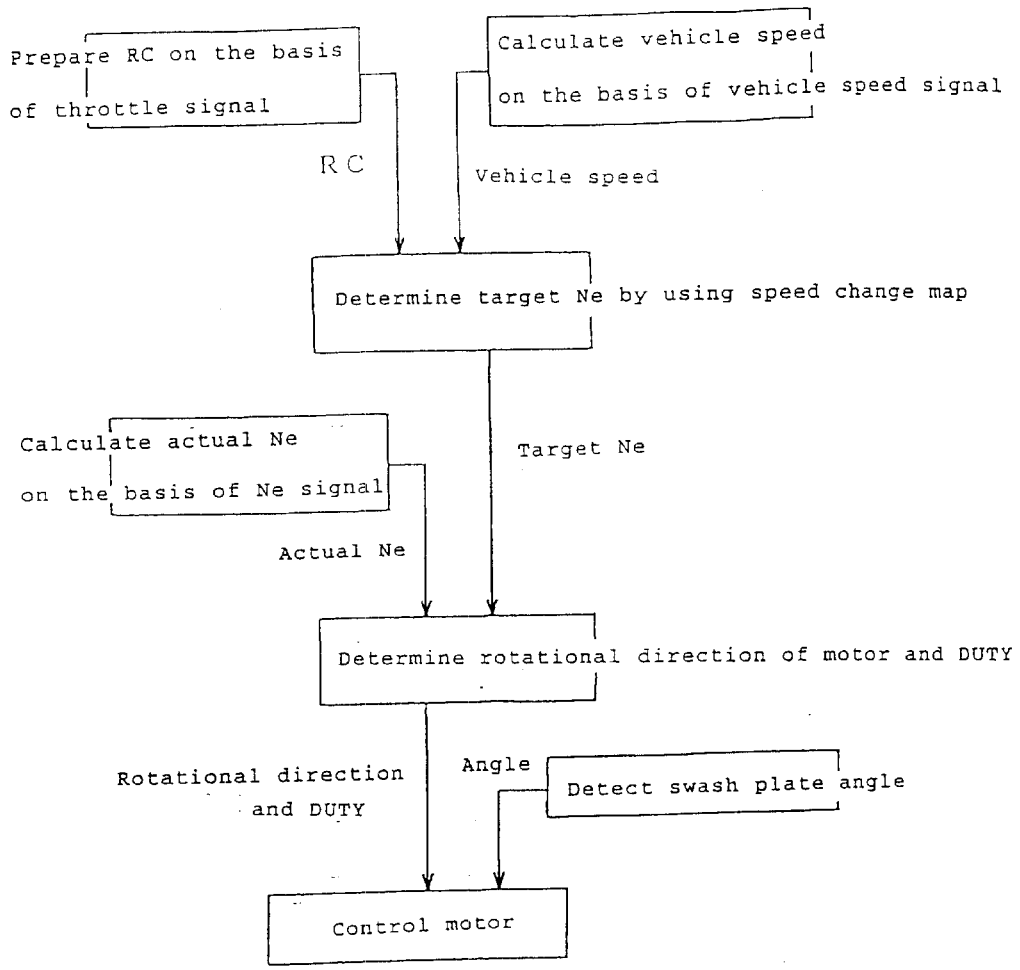
FIG. 3 is a flowchart showing the control of continuously variable speed change.
Figure 4:
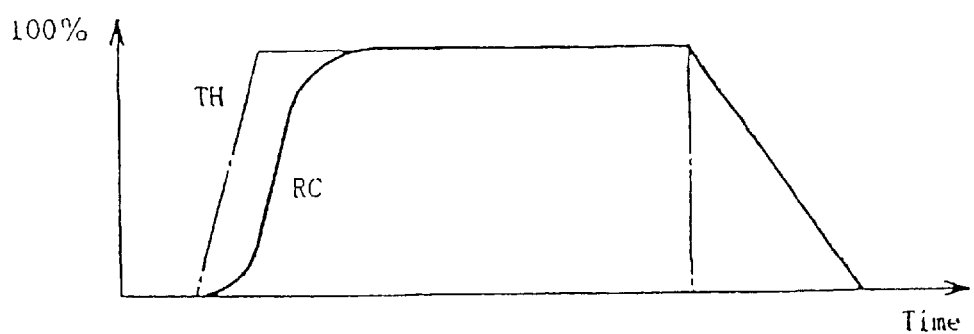
FIG. 4 is a graph illustrating a method of determining an RC (Riding Condition)

The speed change control by the control unit 22 under the continuously variable speed change mode will be described with reference to FIG. 3. First, an RC (Riding Condition) is prepared from a throttle signal supplied from a throttle sensor 23 (see FIG. 1). The RC is a value increased/decreased according to a value of the throttle signal. The basic relationship between the throttle opening and the RC value is as follows:

increase in throttle opening→increase in RC decrease in throttle opening→decrease in RC This relationship is shown in FIG. 4, in which the ordinate designates the throttle opening (%) and RC (%) and the abscissa designates the time. In this figure, character TH designates a throttle opening (%). Referring again to FIG. 3, in addition to preparation of the RC, a vehicle speed is calculated from a vehicle speed signal supplied from a speed sensor 25.

Figure 5:
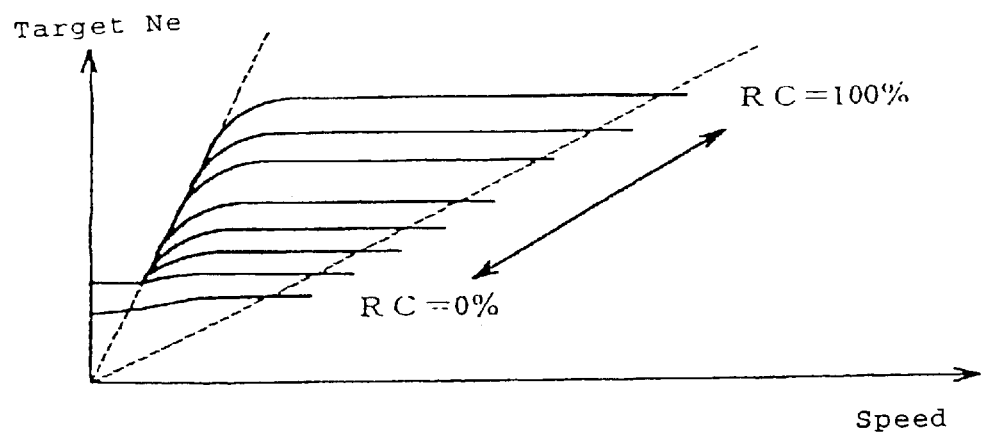
FIG. 5 is a speed change map.

Subsequently, on the basis of the RC and the vehicle speed thus obtained, a target engine speed Ne is determined by using a speed change map previously stored in the control unit 22. One example of the speed change map is shown in FIG. 5. In actual, several kinds of the speed change maps specialized for the L range mode, sport mode, utility mode, and the like are previously stored in the control unit 22. A desired speed change map can be selected from these speed change maps by the mode map switch 29.

Referring again to FIG. 3, an actual engine speed Ne is calculated on the basis of an engine speed Ne signal supplied from a rotation sensor 24 (see FIG. 1), and a rotational direction (normal or reverse direction) of the control motor 11. A DUTY value is determined by comparing the actual engine speed Ne with the target engine speed Ne. Concretely, the rotational direction of the control motor 11 is determined by moving the movable swash plate as follows:

actual Ne>target Ne→movement of movable swash
  i. plate on TOP side
actual Ne<target Ne→movement of movable swash
  ii. plate on LOW side The DUTY value is determined on the basis of the following equation:

$$DUTY = K1 \times |\text{real Ne} - \text{target Ne}| (K1: \text{coefficient})$$

Here, DUTY indicates a rate of a current applied to the control motor 11, which is used for speed control of the control unit 11. When DUTY=100%, the rotational speed of the control motor 11 is maximized, and when DUTY=0% the control unit 11 is stopped.

Subsequently, the control motor 11 is controlled according to a tilt angle of the movable swash plate calculated on the basis of the rotational direction of the control motor 11, DUTY, and a tilt angle signal supplied from an angle sensor 26 (see FIG. 1). To be more specific, the control motor 11 is driven on the basis of the rotational direction of the control motor 11 and the DUTY value. On the other hand, the tilt angle of the movable swash plate is measured, and if the detected tilt angle is out of the TOP ratio side, the control motor 11 is stopped.

According to the embodiment, stepping speed change control under the stepping speed change mode can be carried out. The stepping speed change control means speed change control capable of manually switching the speed change ratio just as the speed change control of a manual type multistage transmission. Such stepping speed change control is carried out by controlling the tilt angle of the movable swash plate 40. The control of the tilt angle of the movable swash plate 40 may be performed by the control unit 22 in the same manner as that described above, except that the control content is not continuously but stepwise changed.

The switching between the stepping speed change mode and the automatic speed change mode is performed by the mode map switch 29. When the stepping speed change mode is selected, the stepping speed change operation can be performed by depressing the shift switch 28. The shift switch 28 includes a shift-up button 28a and a shift-down button 28b (see FIG. 1). The gear position is shifted up or shifted down by one stage each time the shift-up button or shift-down button is depressed.

Figure 6:
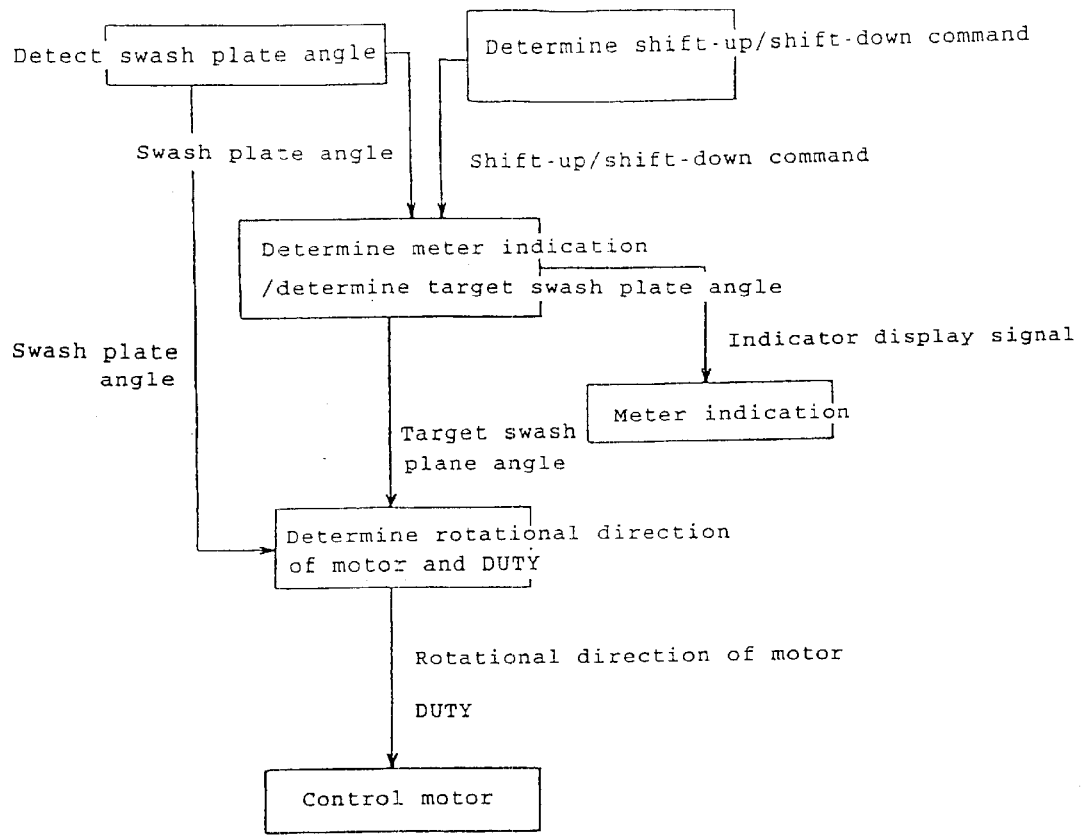
FIG. 6 is a flowchart showing the control of stepping speed change control.

FIG. 6 shows a control procedure of the control unit 22 for carrying out the stepping speed change control. First, a tilt angle is calculated on the basis of a swash plate angle signal supplied from the angle sensor 26, and a shift command indicating shift-up or shift-down is determined on the basis of a shift signal supplied from the shift switch 28. Additionally, the shift-up command is generated when the shift-up button 28a of the shift switch 28 is depressed, and the shift-down command is generated when the shift-down button 28b of the shift switch 28 is depressed.

Subsequently, on the basis of the tilt angle and the shift command thus determined, meter indication is determined and also a target swash plate angle is determined. The meter indication has contents of determining the number of gear stages equivalent to the number of shift stages of a manual transmission, and determining a display signal to be displayed on the indicator of the meter M and outputting the display signal on the meter M to display the determined number of gear stages on the indicator of the meter M.

When the shift command is inputted, the target swash plate angle is determined with respect to the present gear display signal under the following condition:

(1) shift-up command shift-up by one stage
(2) shift-down command shift-down by one stage Subsequently, the normal/reverse rotational direction of the control motor 11 and the DUTY value are determined by comparing the target swash plate angle thus determined with an actual tilt angle, as follows:

(1) actual tilt angle>target swash plate angle→movable swash plate 40 moved on LOW side
(2) actual tilt angle<target swash plate angle→movable swash plate 40 moved on TOP side The DUTY value is determined on the basis of the following equation:

$$\text{DUTY} = K2 \times |\text{real } Ne - \text{target } Ne| \ (K2: \text{coefficient})$$

Subsequently, on the basis of the rotational direction of the control motor 11 and the DUTY value thus determined, the control motor 11 is controlled to tilt the movable swash plate 40 at a specific angle. In this way, the hydrostatic type automatic transmission 1 can carry out the stepping speed change equivalent to the stepping speed change of a manual type multistage transmission.

According to this embodiment, the shift switch 28 and the mode map switch 29 are configured as a common switch. It is possible to use the common switch as the shift switch 28 during running of the vehicle, and to use the common switch as the mode map switch 29 by changing the function thereof only under a specific condition. It should be noted that the mode map switch 29 is one specific example of the mode switch described in claims of the present invention.

Figure 8:
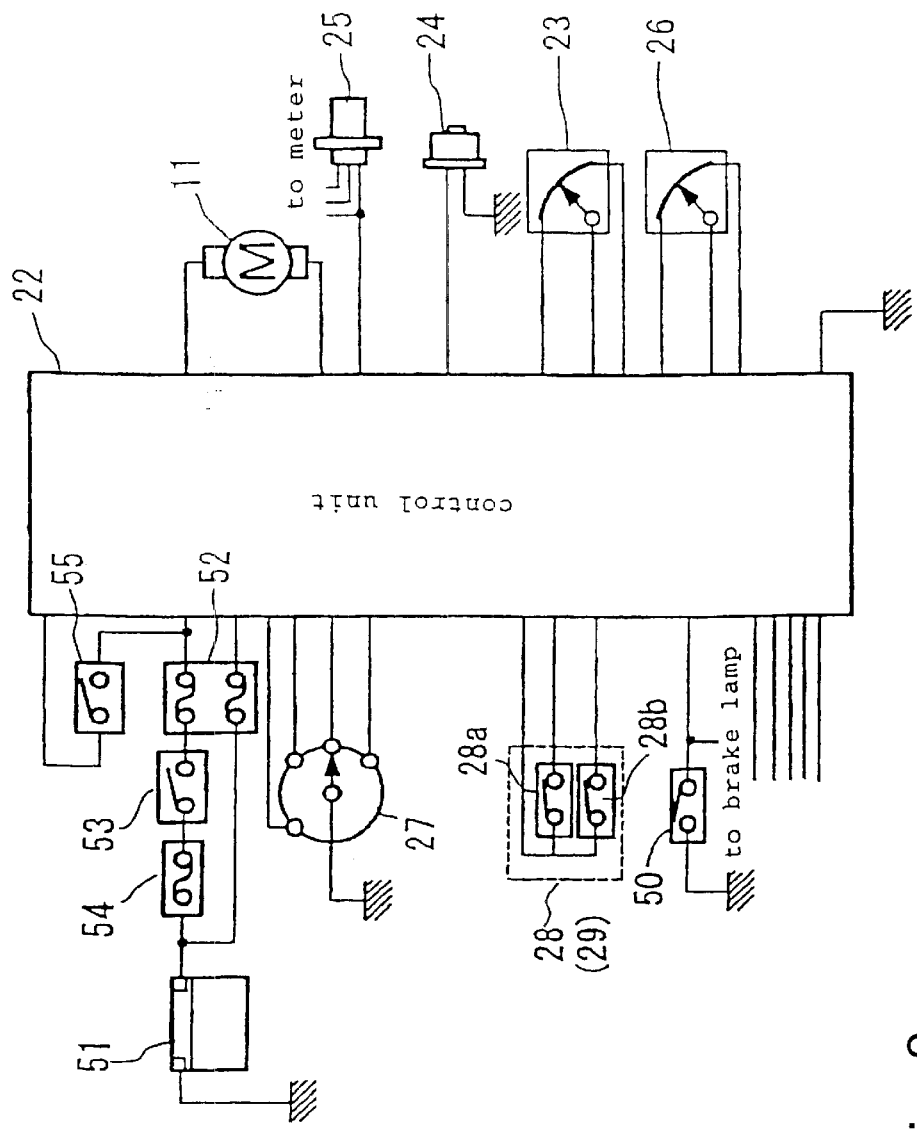
FIG. 8 is a diagram showing the detailed control system of the control unit.

FIG. 8 is a diagram showing part of the control system shown in FIG. 1 in more detail for illustrating a configuration of switches and sensors for generating signals inputted in the control unit 22 for speed change control by the tilt angle control mechanism 10. Referring to FIG. 8 in addition to FIG. 1, the configuration will be described below. The above-described gear position sensor 27, shift switch 28, and brake switch 50 are connected to the input side of the control unit 22.

Referring to FIG. 1, other input signals include signals of a throttle opening detected by the throttle sensor 23 provided on the intake side of the engine 5, of an engine speed Ne detected by the rotation sensor 24 provided in proximity to the crank shaft 6, of a vehicle speed detected by the speed sensor 25 provided in proximity to the final output gear 19, of a swash plate angle detected by the angle sensor 26 provided in the variable displacement hydraulic motor 3, and of a shift position detected by the shift sensor 27 provided integrally with the shift drum 21a of the shifter 21. In addition, the throttle sensor 23 and the angle sensor 26 are each configured as a potentiometer.

The configuration of the motor power supply side will be described below. A battery 51 is connected to the control unit 22 via a fuse 52. A main switch 53 is connected in parallel to the battery 51 via a fuse 54, and is also connected to the control unit 22 via a fuse 52. In the figure, reference numeral 55 designates a kill switch. The control motor 11 is connected to the output side of the control unit 22, and the rotation of the control motor 11 is controlled by the control unit 22.

The shift switch 28 is a switch capable of selecting one of the shift-up switch 28a and the shift-down switch 28b in a toggle manner. A shift-up command or a shift-down command is outputted to the control unit 22 each time the shift-up switch 28a or the shift-down switch 28b is depressed. As described above, it is possible to use the shift switch 28 as the mode map switch 29 by changing the function of the shift switch 28.

Figure 9:
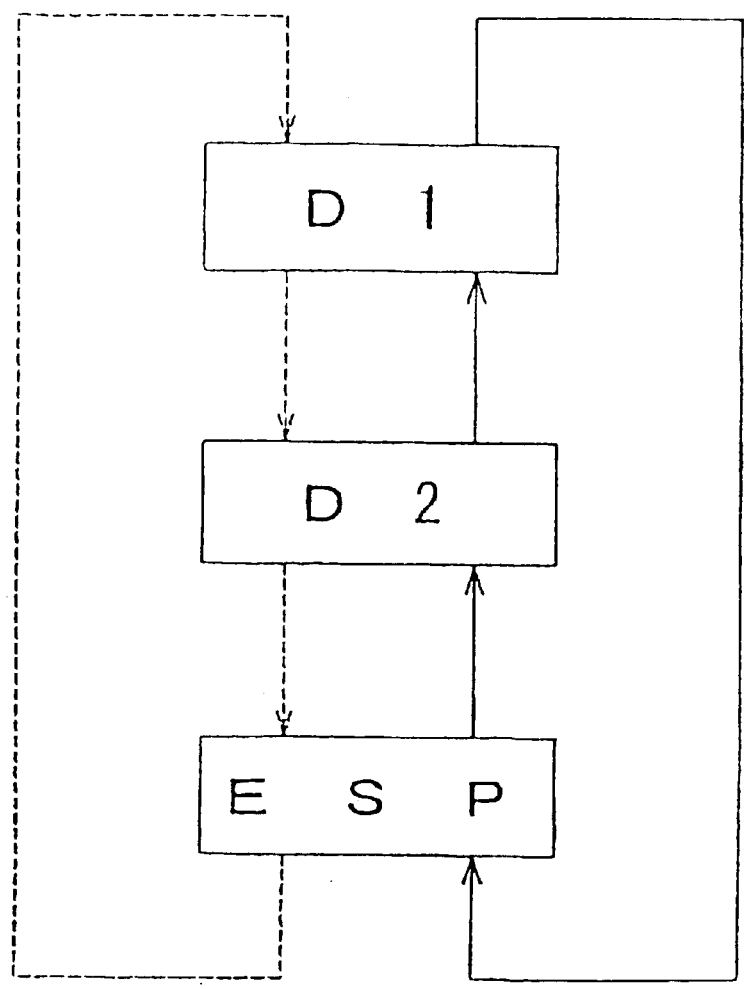
FIG. 9 is a diagram showing a mode switching order.

FIG. 9 shows speed change modes switchable by the mode map switch 29 after the shift switch 28 is changed into the mode map switch 29 by conversion of the functions thereof, and a mode switching order of the speed change modes. By depressing the shift-up switch 28a, the mode is changed in the circulating order of ESP→D2→D1, and by depressing the shift-down switch 28b, the mode is changed in the order D1→D2→ESP, which is reversed to that described above.

Figure 10:
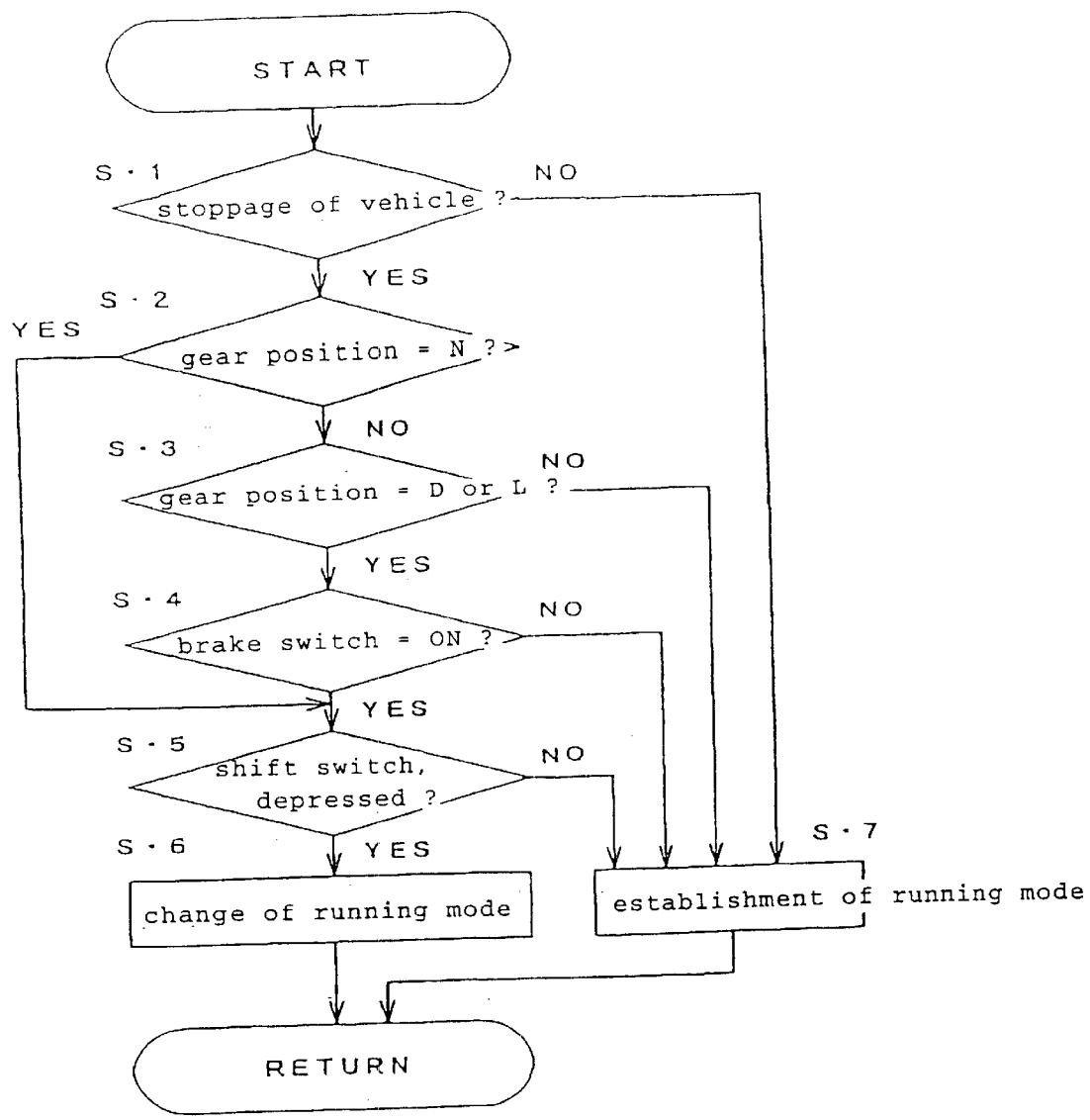
FIG. 10 is a flowchart showing mode changing control.

FIG. 10 is a flowchart showing the control of switching the shift switch 28 and the mode map switch 29 from each other. After start of the program, on the basis of a signal supplied from the speed sensor 25, it is determined in step S.1 whether or not the vehicle is stopped. If NO, which indicates that the shift switch 28 cannot be changed into the mode map switch 29, the process goes on to step S.7 in which the running mode is established, and then the process is returned to the start of the program. If YES in step S.1, on the basis of a signal from the shift sensor 27, it is determined by the shift position sensor 27 in step S.2 whether or not the gear position is located at the neutral (N). If YES, the process is jumped to step S.5, whereas if NO, it is determined in step S.3 whether or not the gear position is turned into the running range (D or L range). If NO in step S.3, the process goes on to step S.7, whereas if YES in step S.3, it is determined in step S.4 whether or not the brake switch is turned on, that is, brake operation is performed.

If NO in step S.4, which indicates that there is a possibility that the vehicle starts running, that is, the mode changing condition is not satisfied, the process goes on to step S.7. If YES in step S.4, which indicates that the mode changing condition is satisfied, it is determined in step S.5 whether or not either the shift-up switch 28a or the shift-down switch 28b of the shift switch 28 is depressed.

If NO in step S.5, which indicates that the driver does not want to change the mode, the process goes on to step S.7. If YES in step S.5, which indicates that the driver wants to change the mode, the process goes on to step S.6 in which the function of the shift switch 28 is changed into that of the mode map switch 29 for allowing selection of one of the running modes shown in FIG. 7, and then the process is returned to the start of the program.

In this way, according to the embodiment, since the shift switch 28 serves as the mode map switch 29, the common switch is can be configured as a multi-function switch, and therefore, since it is not required to provide a plurality of switches specialized for mode selection and shift operation, it is possible to reduce the number of parts and to easily mount the common switch to the vehicular body. In particular, in the case of applying the present invention to a buggy, since the shift switch 28 and the mode map switch 29 are configured as a common switch, the switches can be disposed at one location of the handlebar. Therefore, it is possible for a driver to operate the common switch with one hand while gripping the handlebar with the other hand.

If the common switch is provided on the left side of the handlebar, a brake lever L (see FIG. 1) may be provided on the right side of the handlebar. In this case, the driver can operate the mode map switch 29 changed from the shift switch 28 with the left hand while operating the brake lever with right hand. This makes it possible to enhance operability of the vehicle.

According to the embodiment, since the shift switch 28 can be changed into the mode map switch 29 only when the vehicle is stopped and the brake operation is established, for example, by turning on the brake switch 50, the change of the shift switch 28 into the mode map switch 29 is performed only in a condition with a very small possibility that the shift switch 28 is used. As a result, it is possible to prevent the shift switch 28 from being erroneously used as the mode map switch 29.

Further, according to the embodiment, since the shift switch 28 can be changed into the mode map switch 29 only when the vehicle is stopped and the gear position is in the neutral (N), it is also possible to prevent the shift switch 28 from being erroneously used as the mode map switch 29 during running of the vehicle.

Figure 11:
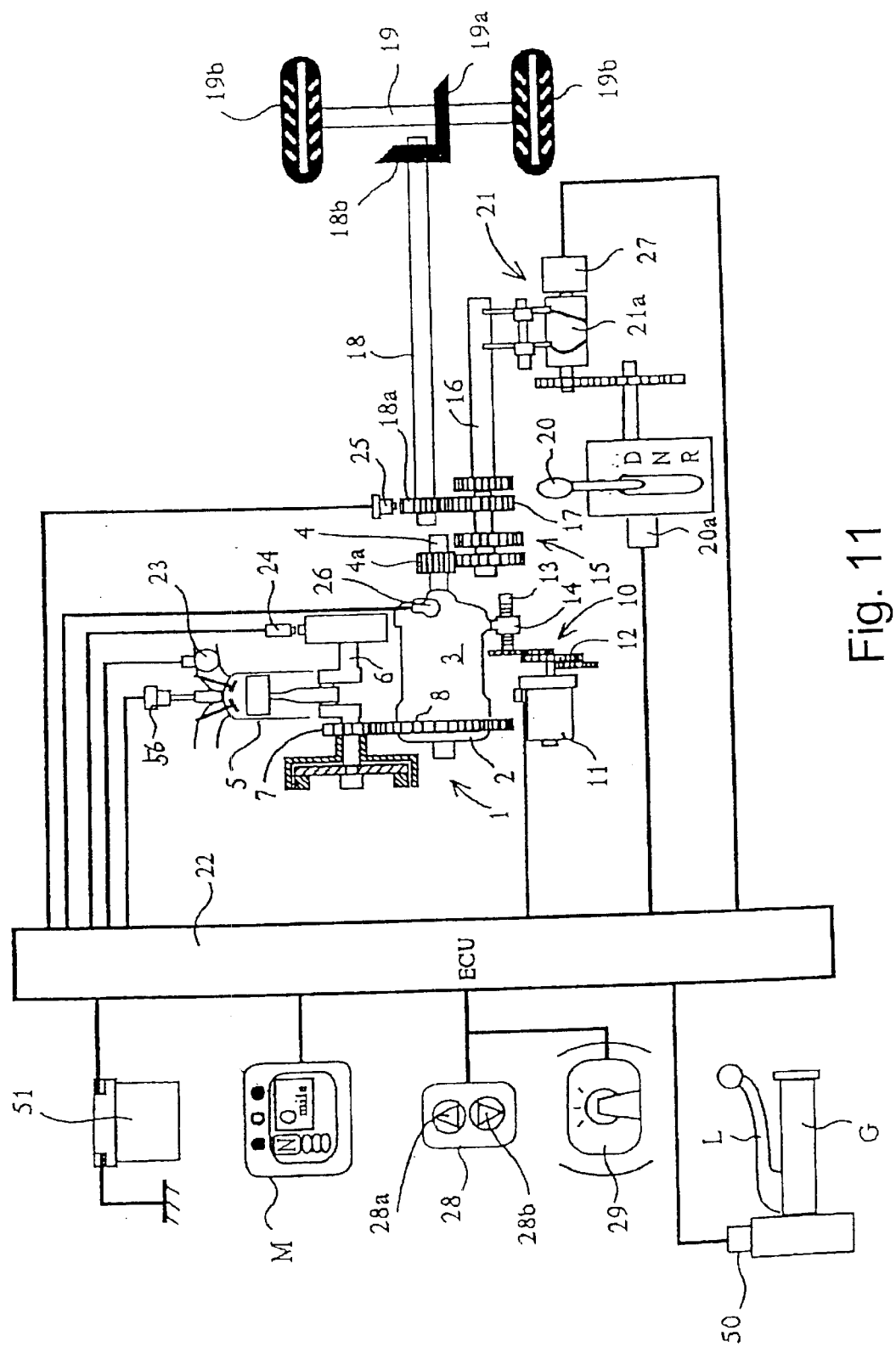
FIG. 11 is a view, similar to FIG. 1, showing another embodiment of the present invention.
Figure 12:
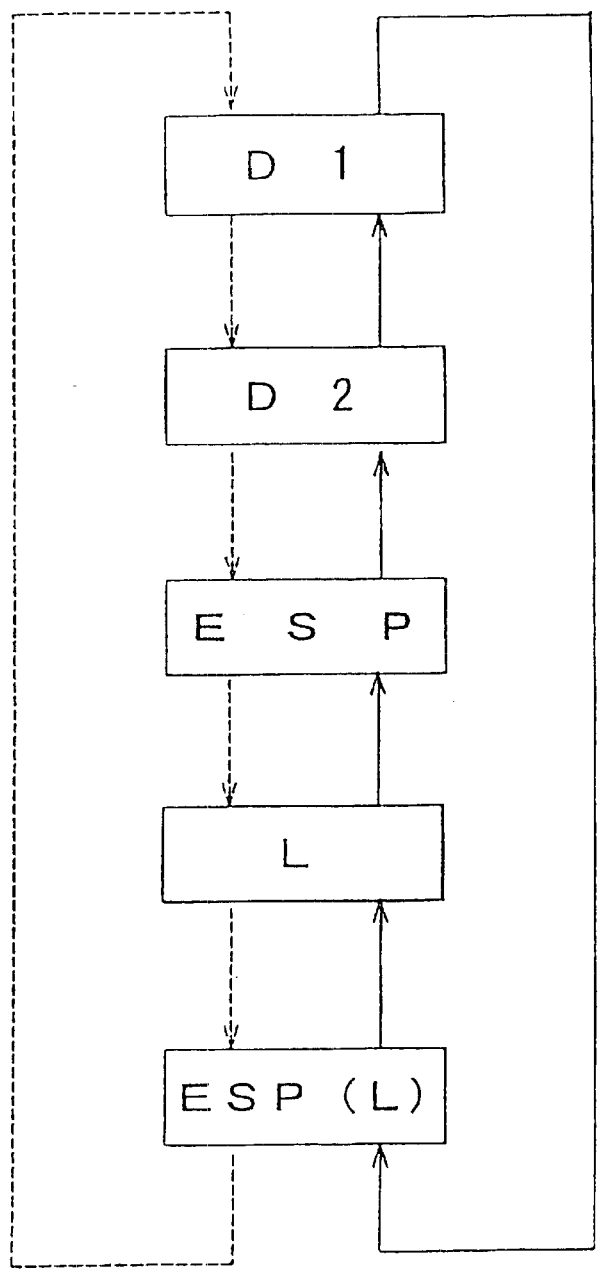
FIG. 12 is a view, similar to FIG. 9, showing the embodiment shown in FIG. 11.
Figure 13:
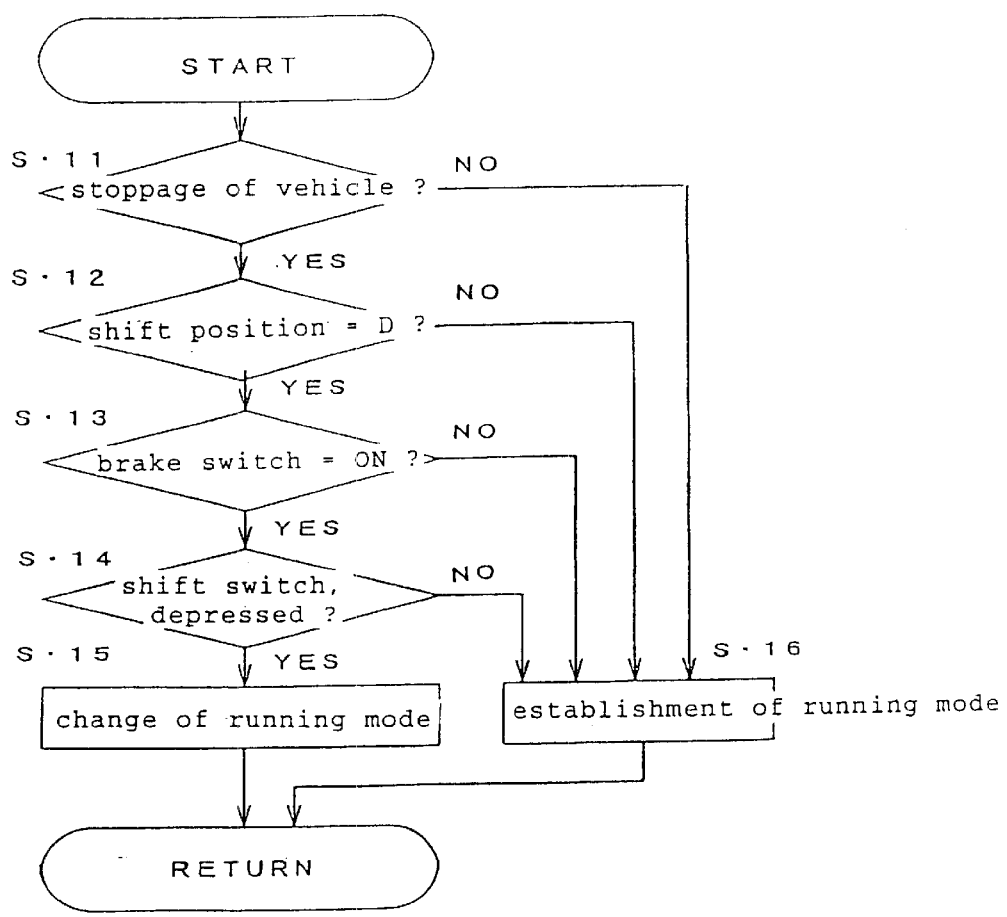
FIG. 13 is a view, similar to FIG. 10, showing the embodiment shown in FIG. 11.

FIGS. 11 to 13 show another embodiment of the present invention. FIGS. 11, 12, and 13 are equivalent to FIG. 1, FIG. 9, and FIG. 10, respectively. In this embodiment, parts corresponding to those in the previous embodiment are designated by the same characters and the repeated description thereof is omitted. This embodiment is characterized in that, of the running ranges switchable by a sub-transmission 15, the running range on the forward running side includes only the drive (D) range, that is, does not include the low (L) range.

As shown in FIG. 11, a sub-transmission lever 20 of the sub-transmission switches one of running ranges, a forward side D, a reverse side R, and a neutral N to another. The running range on the forward side includes only the D range for normal running; however, the D range is widened to the low side so as to include the L (low) range of the first embodiment.

FIG. 12 shows speed change modes switchable by the mode map switch 29 after the shift switch 28 is changed into the mode map switch 29 by conversion of the functions thereof, and a mode switching order of the speed change modes. By depressing the shift-up switch 28*a*, the mode is changed in the circulating order of D1→D2→ESP→L→ESP(L)→D1, and by depressing the shift-down switch 28*b*, the mode is changed in the order reversed to that described above.

Of these modes, D1, D2, and ESP are the same as those described with reference to FIG. 9, which are modes allocated to the D range in the first embodiment. The L and ESP(L) are modes allocated to the L range in the first embodiment, wherein L is an auto (continuously variable speed change) mode, and ESP(L) is a manual mode (see L range in FIG. 7).

FIG. 13 is a flowchart showing the control of switching the shift switch 28 and the mode map switch 29 from each other. After start of the program, on the basis of a signal supplied from the speed sensor 25, it is determined in step S.11 whether or not the vehicle is stopped. Then, it is determined in step S.12 by the shift sensor 27 whether or not the gear position is located at the D range; it is determined in step S13 whether or not the braking is performed by turn ON/OFF of the brake switch 50; and it is determined in step S14 whether or not the shift switch 28 is depressed. If YES at all of steps S.12, S.13 and S.14, the speed change mode is switched. If NO at either of steps S.12, S.13 and S.14, which indicates that the shift switch 28 cannot be changed into the mode map switch 29, the process goes on to step S.16 in which the speed change mode is established, and then the process is returned to the start of the program.

The function of this embodiment will be described below. In this embodiment, since the running range on the forward running side switchable by the sub-transmission 15 includes only the D range by widening the running range on the forward running side to the low side, the speed change operation on the forward running side can be performed, at the time of forward running, only by switching the mode map switch 29 without manual switching of the running range. On the other hand, in the conventional general sub-transmission in which the running range on the forward running side is not widened, the running range must be manually switched to locate the shift position at the D or L mode by the sub-transmission lever.

According to this embodiment, therefore, it is possible to eliminate the laborious operation required for the conventional general sub-transmission, in which the driver's hand must be separated each time the L (low) range is switched to or from the D (drive) range. Also since the speed change mode and the speed change stage under the stepping speed change mode can be switched only by operating the shift switch 28, the speed change operation for running on the forward side can be performed without separation of the driver's hand from the handlebar. As a result, it is possible to eliminate the laborious operation and hence to realize a advantageous comfort operation.

The present invention is not limited to the above-described embodiment, and it is to be understood that various changes may be made without departing from the spirit or scope of the present invention. Further, the present invention can be applied not only to the hydrostatic type automatic transmission system but also to a CTV system, electronic control belt conveyor, or the like.

The invention being thus described, it will be obvious that the same may be varied in many ways. Such variations are not to be regarded as a departure from the spirit and the scope of the invention, and all such modifications as would be obvious to one skilled in the art are intended to be included within the scope of the following claims.

What is claimed is:

1. A transmission system including:
   an automatic transmission having a plurality of speed change modes including at least a continuously variable speed change mode and a steeping speed change mode;
   a sub-transmission connected to said automatic transmission, said sub-transmission being capable of switching to one of a plurality of running ranges including at least a forward range, a neutral range, and a reverse range;
   a mode switch for selectively switching to one of said plurality of speed change modes of said automatic transmission; and
   a shift switch for switching from one speed change stage to another speed change when said stepping speed change mode is active, wherein a function of said shift switch and a function of said mode switch are collectively integrated into a common switch, and said common switch is selectively used as said shift switch or said mode switch.

2. A transmission system according to claim 1, wherein said shift switch is usable as said mode switch only when a brake operation is confirmed.

3. A transmission system according to claim 1, wherein said shift switch is usable as said mode switch only when said running range becomes the neutral range.

4. A transmission system according to claim 1, wherein the forward running range of said running ranges includes only one operable range.

5. A transmission switching device for a vehicle, comprising:

an electronic control unit in operable connection with a transmission system;

a shift switch in operable connection with said electronic control unit; and a mode switch in operable connection with said electronic control unit, wherein said shift switch and said mode switch are integrated as one operable unit, and operability of said mode switch is possible only when the vehicle is stationary.

6. The transmission switching device according to claim 5, wherein the shift switch and the mode switch operate from a single physical switch.

7. A transmission switching device for a vehicle, comprising:

an electronic control unit in operable connection with a transmission system;

a shift switch in operable connection with said electronic control unit; and a mode switch in operable connection with said electronic control unit, wherein said shift switch and said mode switch are integrated as one operable unit, and operability of said mode switch is possible only when the transmission system is in neutral.

8. The transmission switching device according to claim 7, wherein the shift switch and the mode switch operate from a single physical switch.

9. A method for providing vehicle transmission control, comprising the steps of:

providing a single actuatable switch that is functional in controlling both a shifting and mode selection operation of a transmission;

determining an operable state of a vehicle; and allowing actuation of the single actuatable switch into the mode selection operation only when said determining step determines the transmission is in neutral.

10. The method according to claim 9, wherein said allowing step allows actuation of the single actuatable switch into the mode selection operation only when said determining step determines the transmission is in neutral and the vehicle is stationary.

* * * * *